United States Patent [19]

Kattenberg et al.

[11] 4,055,679

[45] Oct. 25, 1977

[54] PLASTIC FAT PRODUCT

[75] Inventors: Hans Robert Kattenberg; Charles Cornelis Verburg, both of Vlaardingen, Netherlands

[73] Assignee: Lever Brothers Company, New York, N.Y.

[21] Appl. No.: 663,015

[22] Filed: Mar. 2, 1976

[30] Foreign Application Priority Data

Mar. 4, 1975 United Kingdom ............... 8937/75

[51] Int. Cl.² ............................................. A23D 3/00
[52] U.S. Cl. .................................................. 426/607
[58] Field of Search ........................................ 426/607

[56] References Cited

U.S. PATENT DOCUMENTS 3,949,105  4/1976  Wieske et al. ................... 426/607

Primary Examiner—Joseph M. Golian
Attorney, Agent, or Firm—Melvin H. Kurtz

[57] ABSTRACT

The invention provides a fat product which notwithstanding a substantially high content of palm oil or palm oil derivates is suitable for preparing emulsion food spreads, e.g. margarine of acceptable hardness values. The fat product contains both co-randomized and non-randomized constituents derived from palm oil or provide 12–25% of SUS triglycerides and a weight ratio of SUS:SSU triglycerides within the range of 0.5 to 2.5.

6 Claims, No Drawings

PLASTIC FAT PRODUCT

The present invention provides plastic fat products which are suitable for the preparation of shortenings and emulsified food spreads, such as margarines and low fat spreads, as well as margarines and low fat spreads prepared therefrom.

A problem often encountered in fat products, particularly those containing relatively high proportions of palm oil or its hydrogenated and/or fractionated derivatives, is the unacceptable hardness of the product, e.g. as measured at 10° C by the method of A. J. Haighton (cf. J.A.O.C.S, 36 (1959), p.p. 345 – 348). Suitable hardness values at 10° C are e.g. from 200 to 1500 g/cm2, preferably from 500 to 1200 /cm2.

The fat product of the invention comprises both co-randomised and non-randomised constituents derived from palm oil, so as to provide 12 – 25% of SUS triglycerides and a weight ratio of SUS : SSU triglycerides within the range of 0.5 to 2.5.

Preferably the SUS content is from about 15 to 25%, particularly 15 to 22%, and the weight ratio of SUS : SSU triglycerides is in the range of 0.8 to 2.0, particularly 0.8 to 1.5.

In this specification S stands for saturated fatty acid residues with 8 – 24 carbon atoms, SUS for 1,3-disaturated, -2-mono-unsaturated triglycerides, SSU for 1,2-disaturated-3-unsaturated triglycerides.

Preferably the fat product of the invention comprises 35 to 45%, especially 38 to 45% of saturated fatty acid residues.

This can e.g. be achieved by preparing the fat product from 50 – 75% of palm-based fats and co-randomising part of said palm-based fat with fats containing at least 80% of fatty acids with a chain length of 18 carbon atoms or more. Suitably from 20 to 90%, preferably 40 – 80% of the total content of palm-based fats is co-randomised and preferably the fat product so obtained contains at least 50%, preferably 70–85% of co-randomised constituents.

The fat product of the present invention can be prepared from fats that are substantially free from trans-fatty acid residues. Consequently, a significant advantage of the fat product of the invention is that it can be prepared without involving a complicating partial hydrogenation step. Therefrom the fats present in the fat product of the invention are preferably substantially trans free, and most preferably unhydrogenated. Particularly the fat product of the invention contains in either its co-randomised constituent or its non-randomised constituent or in both constituents, fractions of palm oil.

Preferably the non-randomised part of the fat product contains the olein fraction of the palm-based fat, i.e. the fraction obtained after removal of the higher melting triglycerides. The remaining stearin fraction can if desired be co-randomised with fats containing at least 80% of fatty acid residues with a chain length of 18 carbon atoms or more.

The term "fat" is used in this specification to include fatty acid triglycerides which are solid at 20° C and are commonly described as "fats" as well as triglycerides which are liquid at that temperature and which are commonly described as "oils". A "fatty phase" is a fat or fat blend which is suitable as the sole fat blend in the emulsions of the invention. Similarly a "margarine fat" is a fat blend which is suitable as the fatty phase in margarine. Unless stated otherwise, the terms "emulsions", "margarine", "food spread" etc. refer to water-in-fat emulsions containing the fat product of the invention and optionally suitable amounts of fat-soluble emulsifiers, e.g. partial fatty acid glycerides like monoglycerides, phosphatides, and fractions thereof, etc. and/or water-soluble emulsifiers, e.g. partial glycerides, phosphatides, egg yolk, protein etc.

The term "palm-based fat" as used in this specification includes both hydrogenated and unhydrogenated palm oil, as well as solid and liquid fractions thereof. The palm-based fat should be present both in co-randomised and in non-randomised form in the fat blend of the invention.

The term "randomising" refers to the interchange of the fatty acid radicals of the glycerides on the glyceryl radicals in random fashion. This interchange, when applied to at least two different fat sources, is called "co-randomising" and can e.g. be effected under the influence of an interesterification catalyst at temperature of about 25° – 175° C, preferably 80° –140° C. Suitable catalysts are alkali metals, their alloys, their hydroxides, their alkoxides, e.g. in proportions of 0.01% to 0.3 or 0.5% by weight.

The fat product obtained by the invention is particularly of importance in emulsions containing from 40 or 50 up to 85% of a fatty phase, the balance of the emulsion being an aqueous phase, which can be water, milk or skim milk adjusted to the required pH value, e.g. of about 4 or 4.5 to 6 or 7, and which can contain, apart from suitable water-soluble emulsifiers, various minor ingredients, e.g. salt, acid, protein, flavours, preservatives etc.

In this specification all percentages, proportions and parts are by weight unless otherwise specified. The amount of fats in the emulsion is based on the weight of the emulsion, the amount of individual triglycerides and fats in the fat product is based on the weight of the fat product and the amount of fatty acids in a fat is based on the total amount of fatty acids in said fat, unless otherwise stated.

It will be evident to the expert that with a given number of raw materials the amount of palm-based fat which is co-randomised with the other fat can easily be determined by experimentation so as to obtain a fat blend with the required SUS content and SUS : SSU ratio. The amounts of SUS and SSU triglycerides in the fat blend can be calculated from their contents in the available raw materials used. These contents can be calculated from the total fatty acid composition and the fatty acid composition of the 2-monoglycerides obtained by enzymatic hydrolysis with pancreatic lipase according to M. H. Coleman described in J. of Am. Oil Chem. Soc. 38 (1961), 685-8.

It will also be evident to the expert that the type of fat, and the amount thereof, with which part of the palm-based fat is co-randomised, is equally governed by the SUS content and the SUS : SSU ratio of the raw materials. The balance of the fat blend can solely consist of the non-co-randomised palm-based fat, or can comprise other fats. The non-randomised fats can be of any type, provided the required SUS : SSU ratio for the total fat blend remains within the range from 0.5 to 2.5.

This weight-ratio of SUS : SSU triglycerides and the total SUS content is of importance for an optimal proportion of non-chemically bound compounds, which have been described by J. B. Rossell in Advances in Lipid Research 5 (1967), 391 – 394. Such compounds favourably influence the hardness values of the fat product at e.g. 10° C and moreover have proved to be particularly advantageous for providing the desirable plastic properties to the fat products. The fat products obtained by the present invention contain a sufficient proportion of such compounds to confer a high degree of plasticity to the emulsified food spreads prepared therefrom. The favourable influence of these non-chemically bound compounds on the hardness of the fat product is most surprising, since their melting points are substantially higher than those of the individual SUS and SSU triglycerides.

The following examples illustrate the invention:

Fat blend were prepared by co-randomising palm oil, palm oil stearin, soybean oil, hydrogenated soybean oil, and sunflower oil.

Preparation of hardened fats

Soybean oil of an Iodine Value of 133 was hydrogenated at 105° C while using 0.1% of nickel on Kieselguhr catalyst (calculated as percentage of nickel on oil). After reaching an Iodine Value of 95 and a melting point of 28° C the catalyst was filtered off and the oil was conventionally refined. Similarly hydrogenated palm oil olein was hydrogenated at 180° C to an m.p. of 36° C after addition of 0.2% of a sulphurized nickel catalyst. The catalyst was removed and the oil was conventionally refined.

Fractionation

The fractionation was carried out by dry fractionation. This was effected by heating the palm oil to about 45° to 65°, subsequently regularly cooling it to 25°–28° C and subsequently keeping it as this temperature for about 1 hour. The cooling treatment was carried out with gentle stirring and after the crystallisation period the stearins were filtered off and the olein was obtained in a yield of about 70–80%. The remaining stearins were used in examples 1–3 as part of the co-randomised constituent.

Co-randomising

The fats to be co-randomised were dried to a water content of about 0.01% by weight and subsequently co-randomised at 90° C in a stirred vessel which was kept under a vacuum of 2 cm mercury, in the presence of 0.1% of sodium methoxide as a catalyst. After 20 minutes the mixture was cooled and the vacuum released. The catalyst was destroyed by washing the co-randomised blend with water and the fat was dried as before, and conventionally refined.

Margarine preparation

The margarine fat blend was melted and emulsified with an aqueous phase prepared from soured milk containing 0.1% mono-diglycerides to give an emulsion containing 80% of fat.

The emulsion was crystallised and worked in two closed tubular surface-scraped heat-exchangers (Votator A-units); the latter of the two was left at a temperature of 10°–15° C. Between said Votator A-units a slowly agitated uncooled crystalliser was placed for increasing the residence time to about 2–3 minutes. The crystallised emulsion leaving the later Votator A-units was then passed through a resting tube (Votator B-unit), where it crystallised further for about 3 minutes. The margarine was then packed.

The hardness and dilation values compiled in the following tables are those of the margarines obtained.

| | example number: | 1 | 2 | 3 | 4 | 5 | 6 |
|---|---|---|---|---|---|---|---|
| Non-randomised | Palm oil (a) | — | — | 10 | 20 | — | — |
| | Palm oil olein (b) | — | 20 | 5 | — | — | 10 |
| | Hydrogenated palm oil olein (m.p. 36° C) (c) | 25 | — | 5 | — | 25 | 15 |
| Co-randomised | Palm oil (a) | 37 | 40 | 40 | 43 | 38 | 45 |
| | Palm oil stearin (d) | 8 | 7 | 3 | — | — | — |
| | Soybean oil (e) | 30 | 33 | 37 | 37 | — | — |
| | Hydrogenated soybean oil (m.p. 28° C) (f) | — | — | — | — | — | 30 |
| | Sunflower oil (g) | — | — | — | — | 37 | — |
| Hardness (in g/cm² according to Haighton) | | | | | | | |
| | at 10° C | 880 | 1190 | 1050 | 1115 | 640 | 1490 |
| | at 15° C | 570 | 770 | 610 | 800 | 320 | 1050 |
| | at 20° C | 150 | 250 | 260 | 265 | 150 | 350 |
| | | 1 | 2 | 3 | 4 | 5 | 6 |
| Dilatation (in mm3/25 according to Boekenoogen*) | | | | | | | |
| | at 10° C | 650 | 630 | 610 | 600 | 570 | 810 |
| | at 20° C | 370 | 370 | 320 | 330 | 300 | 490 |
| | at 30° C | 150 | 130 | 140 | 160 | 100 | 200 |
| | at 35° C | 50 | 45 | 60 | 70 | 30 | 90 |
| S weight percent | | 41.0 | 39.7 | 38.3 | 38.3 | 36.4 | 41.1 |
| SUS weight percent | | 17.5 | 15.5 | 15.4 | 15.2 | 16.0 | 17.5 |
| SUS/SSU weight ratio | | 1.0 | 1.9 | 1.0 | 1.0 | 1.2 | 1.1 |

| | example number: | 7 | 8 | 9 | 10 | 11 |
|---|---|---|---|---|---|---|
| Non-randomised | (a) | — | — | — | — | — |
| | (b) | — | 10 | 15 | 10 | 15 |
| | (c) | 25 | 10 | 5 | 5 | — |
| Co-randomised | (a) | 38 | 48 | 48 | 48 | 48 |
| | (e) | 37 | 32 | 32 | 32 | 32 |
| Hardness g/cm² | | | | | | |
| | at 10° C | 740 | 575 | 730 | 700 | 610 |
| | at 15° C | 440 | 460 | 430 | 460 | 370 |
| | at 20° C | 120 | 110 | 100 | 100 | 120 |
| Dilatation values mm3/25g | | | | | | |
| | at 10° C | 730 | 620 | 590 | 640 | 610 |
| | at 20° C | 310 | 300 | 290 | 350 | 330 |

|  | at 30° C | 120 | 100 | 110 | 140 | 140 |
|---|---|---|---|---|---|---|
|  | at 35° C | 50 | 40 | 40 | 60 | 50 |
| S weight percent | | 37.3 | 39.4 | 39.3 | 39.6 | 39.5 |
| SUS weight percent | | 15.8 | 15.0 | 15.0 | 15.0 | 15.0 |
| SUS/SSU weight ratio | | 1.2 | 1.0 | 1.0 | 1.0 | 1.0 |

*cf. "Analysis and Characterization of Oils, Fats and Fat Products", Vol. I, 1964, Interscience Publishers, London, p.p. 143 et seq.

Similarly various low fat spreads containing no more than 40% of the fat product as a continuous fat phase were prepared from the fat product of Example 5. However, the sunflower oil in the co-randomised constituent was then replaced by safflower oil, groundnut oil, cottonseed oil, olive oil and corn oil. All these fat spreads had excellent hardness values both at 10° and at 20° C, i.e. within the range of 300 to 1500 g/cm². Content of S, SUS and SSU in raw materials:

| Raw Materials | S | SUS | SSU |
|---|---|---|---|
| (a) | 52 | 41.6 | 7.4 |
| (b) | 47.4 | 39.2 | 6.3 |
| (c) | 48.7 | 40.7 | 8.5 |
| (d) | 64.0 | 48.8 | 10.7 |
| (e) | 15.0 | 5.3 | 0.8 |
| (f) | 19.0 | 7.1 | 2.6 |
| (g) | 12.0 | 3.3 | 0.3 |

The SUS and SSU content in the co-randomised constituent (indicated as SUS* and SSU*) was calculated as follows:

$S^* = \sum c_i \times S_i$ $SUS^* = 100 \times ((S/100)^2 - (S/100)^3)$ $SSU^* = 2 \times SUS$ in which $S_i$ = S content of component i of co-randomised constituent $c_i$ = content of component i in co-randomised constituent $S^*$ = S content of co-randomised constituent.

We claim:

1. Fat product containing 50–75% of palm-based fats selected from the group consisting of hydrogenated and unhydrogenated palm oil and solid and liquid fat fractions thereof, 20–90% of said palm-based fats being co-randomised with the balance of fats containing at least 80% of fatty acids with a chain length of 18 carbon atoms or more to provide at least 50% of co-randomised triglycerides in said fat product, the balance of the palm-based fats being non-randomised, said fat product containing 15–25% of 1,3-disaturated, -2-mono-unsaturated triglycerides, the weight ratio between 1,3-disaturated,-2-mono-unsaturated and 1,2-disaturated,-3-mono-unsaturated triglycerides being within the range of 1.8 to 1.5, the saturated acid residues of forementioned triglycerides having 8–24 carbon atoms.

2. Fat product according to claim 1, in which the content of 1,3-disaturated,-2-mono-unsaturated triglycerides is 15–22%.

3. Fat product according to claim 1, containing 35 to 45% of saturated fatty acid residues.

4. Fat product according to claim 3, containing 38 to 45% of saturated fatty acid residues.

5. Fat product according to claim 1, comprising 70–85% of co-randomised constituents.

6. Fat product according to claim 1, which is substantially free from hydrogenated fats.

* * * * *

UNITED STATES PATENT AND TRADEMARK OFFICE
CERTIFICATE OF CORRECTION

PATENT NO. : 4,055,679

DATED : October 25, 1977

INVENTOR(S) : Hans Robert Kattenberg et al.

It is certified that error appears in the above-identified patent and that said Letters Patent are hereby corrected as shown below:

In the Claims:

Claim 1, col. 6, line 24: change "1.8" to -- 0.8 --.

Signed and Sealed this

Sixteenth Day of May 1978

[SEAL]

Attest:

RUTH C. MASON
Attesting Officer

LUTRELLE F. PARKER
Acting Commissioner of Patents and Trademarks